April 11, 1933.  F. P. RYDER  1,903,658
PEA THRESHING MACHINE
Filed July 23, 1930
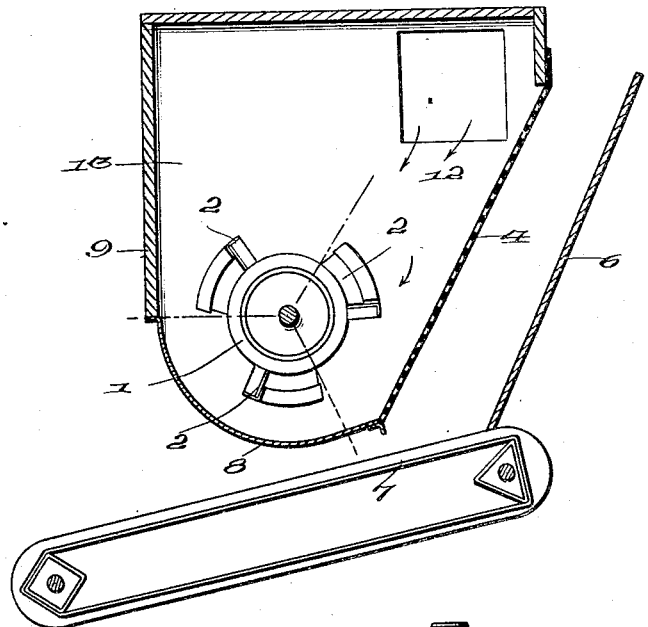
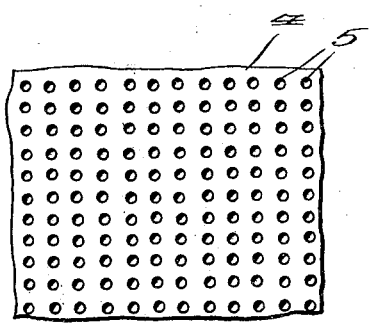
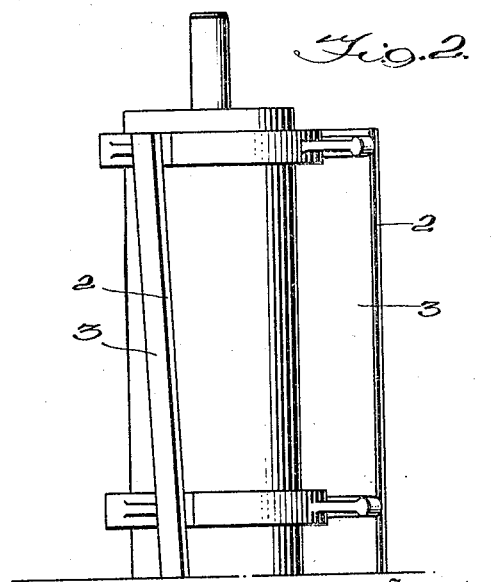
Inventor
Frank P. Ryder,
By
Attorney Patented Apr. 11, 1933

1,903,658

UNITED STATES PATENT OFFICE

FRANK PITTIS RYDER, OF NIAGARA FALLS, NEW YORK

PEA THRESHING MACHINE

Application filed July 23, 1930. Serial No. 470,151.

My invention relates to means for threshing green peas and has for its object to improve and render more efficient the apparatus for threshing green peas described and claimed in the application for Letters Patent of the United States filed by me October 16, 1929, Serial No. 400,095.

The apparatus described and claimed in my said application is so constructed and arranged that the vines introduced into the apparatus slide down an incline into the path of movement of the beaters and are thrown back up the incline to effect the opening of the pods to permit the peas to escape, the incline shown and described therein consisting of a board or plate of rigid material extending upward and away from a vertical plane longitudinal of the axis of the beater cylinder and provided with vertical grooves down which the peas may slide, the faces of the beater arms being sloped at an angle from the line of a radius of the beater cylinder in a direction away from the direction of rotation of the beater cylinder, the space between the outer edges of the beater arms and the portion of the grooved board near its lower end being small.

The apparatus of my present invention differs from that shown and described in my said application in that in place of the inclined stationary grooved board I use an inclined screen such as the perforated rubber sheet commonly used as a screen in viners and so arrange this screen that a portion of it is close to the path of movement of the outer edges of the beater arms and I arrange below the beater cylinder a shoe curved on an arc of a circle concentric with the axis of the beater cylinder and so spaced away from the path of movement of the outer edges of the beater arms that peas will not be crushed between it and the beater arms.

With the objects above indicated and other objects hereinafter described in view my invention consists in the construction and combination of elements hereinafter described and claimed.

Referring to the drawing:

Figure 1 is a cross sectional view of a threshing machine embodying my invention.

Figure 2 is a side view of the beater cylinder shown in Figure 1, and

Figure 3 is a face view of the screen.

In the drawing 1 indicates a six sided beater cylinder similar in construction to the beater cylinder used in the commonly known viner for thrashing green peas and has on its sides beater arms 2 arranged as shown with their beater faces 3 sloped away and outward from the direction of rotation at a substantial angle which may be 45 degrees radial lines extending through the inner edges of the beater arms being indicated in dotted lines. While these beater arms may be of relatively short length longitudinally of the beater cylinder they are preferably continuous from end to end of the beater cylinder as shown in Figure 2, three of them equally spaced apart being used.

4 indicates the inclined screen preferably of sheet rubber having perforations 5 sufficiently large to permit free passage of peas. Back of screen 4 is an inclined board or plate 6 preferably at an angle nearer the perpendicular than the angle at which screen 4 is arranged, this board or plate 6 being arranged to guide peas which have passed through the perforations of the screen to a suitable conveyor 7 which may be of any convenient construction.

The lower front edge of the screen 4 extends somewhat below the lowest point in the path of movement of the beater arms 2 and is there secured to the forward edge of a shoe 8, preferably of sheet metal, which extends below the beater cylinder and up to about the level of its axis and at its upper rear edge is secured to the back board 9. This shoe is curved on an arc of a circle concentric with the axis of the beater cylinder and is so spaced away from the beater cylinder that a substantial space, preferably 4 inches, is left between the outer edges of the beater arms 2 and the screen.

The backboard 9 extends upward above the level of the beater cylinder and a cover 10 may connect its upper edge with a front board 11 to the lower edge of which is secured the upper edge of screen 4.

The beater arms 2 are arranged at a slight angle to the longitudinal axis of the beater cylinder so as to cause vines to be fed towards the delivery end of the machine.

12 indicates an opening in the end board 13 above the plane of the beater cylinder through which vines may be introduced.

In the operation of the machine vines introduced into it are acted upon by the beater arms to cause the pea pods to split open to discharge the peas. The slope of the faces of the beater arms is such that the vines are thrown outward towards the screen rather than upward so that as each beater arm passes the vines will tend to drop into the path of the next beater arm, the tendency to carry the vines over the beater cylinder being thus checked, though more or less of the vines will probably be carried over. Whatever is so carried over will fall on the shoe 8 and will be carried towards the front of the machine by the air current created by the beater arms rather than by actual contact, the air current created by the unbroken surface of the long beater arms, extending from end to end of the beater cylinder, being more effective in its action upon the vines than the currents created by a succession of relatively short beater arms.

The vines are preferably fed into the machine through a suitable opening 14 above the level of the axis of the beater cylinder and, as is usual in viners, the threshed vines are discharged through an opening (not shown) below the level of the beater cylinder.

The nearest prior art is shown in patents to Brakeley, No. 593,426, Nov. 9, 1897, and 682,908, Sept. 17, 1901, in which the shoe and the lower end of the screen are arranged so close to the ends of the beater arms that the vines will be dragged between them and the pods and the peas will be crushed as described and the beater arms are so constructed as to carry the vines over the beater cylinder. By so spacing the shoe and the lower end of the shoe away from the ends of the beater arms the crushing of the pods and the peas will be avoided and by reason of the sloping of the faces of the beater arms the tendency to carry the vines over the beater cylinder is avoided.

In the form of viner as used throughout the art at the present time the vines are lifted on ribs and dropped into the path of rapidly rotating beaters. The vines must pass over the beater cylinder which is rotating very rapidly and in effect presents a cylindrical surface made up of successive beater edges. This cylindrical surface is approximately 4" distance from the lifting ribs and the vine mass must pass continually through this 4" space. A space of 4" permits the vines and pods to pass between the edge of the rib and the beater without undue injury to the pea berries contained in the pods carried by the vines. In the present invention, the space between the beaters and the shoe is made as great as that between the rib and the beater in the viner now in use. The working parts of the machine are designed to cause the vines to oscillate up and down on the face of the sifting screen receiving successive blows and working toward the discharge end. The shoe is arranged to take care of the vines that are occasionally carried over the top of the cylinder by catching on the beater faces. The space between the beater and the shoe is made sufficiently great to prevent injury to the few vines that pass over in this manner. In the Brakeley machine the vines were rubbed between the beaters and a shoe which caused great damage to the peas and resulted in the abandonment of the Brakeley machine as a commercial proposition.

Having thus described my invention, what I claim is:

1. In a machine for threshing green peas or beans a beater cylinder, a series of beater arms carried by the beater cylinder having their faces inclined rearward from a radius, a stationary screen arranged opposite one side of the beater cylinder having its lower edge below the lowest point in the path of movement of the beater arms, a shoe extending beneath the beater cylinder with its forward edge connected to the lower edge of the screen, the screen and shoe being so arranged with reference to the beater cylinder that a substantial space is left between their inner faces and the ends of the beater arms of such extent as to permit vines carrying pods to pass without rubbing action on the pods.

2. In a machine for threshing green peas or beans a beater cylinder, a series of beater arms carried by the beater cylinder having their faces inclined rearward from a radius, a stationary screen arranged opposite one side of the beater cylinder having its lower edge below the lowest point in the path of movement of the beater arms, an imperforate shoe extending beneath the beater cylinder with its forward edge connected to the lower edge of the screen, the screen and shoe being so arranged with reference to the beater cylinder that a substantial space is left between their inner faces and the ends of the beater arms of such extent as to permit vines carrying pods to pass without rubbing action on the pods.

3. In a machine for threshing green peas or beans, a beater cylinder, a series of beater arms carried by the beater cylinder having their faces inclined rearward from a radius, having their faces sloped in a direction opposite their direction of rotation away from a radius from the axis of the beater cylinder, a stationary screen arranged opposite one side of the beater cylinder having is lower edge below the lowest point in the path of movement of the beater arms, a shoe extending beneath the beater cylinder with its forward edge connected to the lower edge of the screen, the screen and shoe being so arranged with reference to the beater cylinder that a substantial space is left between their inner faces and the ends of the beater arms of such extent as to permit vines carrying pods to pass without rubbing action on the pods.

4. In a machine for threshing green peas or beans a beater cylinder, a series of beater arms carried by the beater cylinder having their faces inclined rearward from a radius, having their faces sloped in a direction opposite their direction of rotation away from a radius from the axis of the beater cylinder, a stationary screen arranged one side of the beater cylinder having its lower edge below the lowest point in the path of movement of the beater arms, an imperforate shoe extending beneath the beater cylinder with its forward edge connected to the lower edge of the screen, the screen and shoe being so arranged with reference to the beater cylinder that a substantial space is left between their inner faces and the ends of the beater arms of such extent as to permit vines carrying pods to pass without rubbing action on the pods.

In testimony whereof, I hereunto affix my signature.

FRANK PITTIS RYDER.